United States Patent [19]

Goudy, Jr.

[11] Patent Number: 4,729,665
[45] Date of Patent: Mar. 8, 1988

[54] FLUID MIXER/CHARGER AND METHOD

[75] Inventor: Paul R. Goudy, Jr., Milwaukee, Wis.

[73] Assignee: Autotrol Corporation, Milwaukee, Wis.

[21] Appl. No.: 945,353

[22] Filed: Dec. 22, 1986

Related U.S. Application Data

[63] Continuation of Ser. No. 645,809, Aug. 29, 1984, Pat. No. 4,684,254.

[51] Int. Cl.$^4$ .............................................. B01F 5/06
[52] U.S. Cl. .................................. 366/340; 48/189.4; 261/DIG. 80
[58] Field of Search .................. 366/127, 336, 340; 48/189.4, 189.6; 261/DIG. 80; 123/537, 538, 539

[56] References Cited

U.S. PATENT DOCUMENTS

| | | | |
|---|---|---|---|
| 3,805,492 | 4/1974 | King | 48/189.4 X |
| 3,856,270 | 12/1974 | Hemker | 366/340 |
| 3,885,539 | 5/1975 | Hicks | 48/189.6 X |
| 4,019,476 | 4/1977 | Ackley | 48/189.4 X |
| 4,514,095 | 4/1985 | Ehrfeld et al. | |

Primary Examiner—Philip R. Coe
Attorney, Agent, or Firm—Renner, Otto, Boisselle & Lyon

[57] ABSTRACT

According to one aspect of the invention, a fluid mixer/charger includes an inlet for receiving input flowing fluid, the inlet including a flow directing portion for directing fluid in the first directional flow path, an outlet positioned to receive fluid flowing from the inlet to direct the fluid along a second directional flow path different from the first one, and a charging device for applying or removing electrical charge with respect to fluid during flow by at least one of the inlet and outlet. The invention functions as an electric capacitor with a fixed bleed rate to charge fluid. According to an additional aspect, a method of mixing and charging of fluid includes directing a fluid through a mixer/charger device, including receiving an input fluid, directing the input fluid along a flow path defined at least in part by at least partially electrically conductive members, at least once during flow of fluid along the flow path changing the direction of fluid flow and the number of streams in which such fluid flows, and applying or removing an electrical charge with respect to the fluid flowing through the mixer/charger.

17 Claims, 10 Drawing Figures

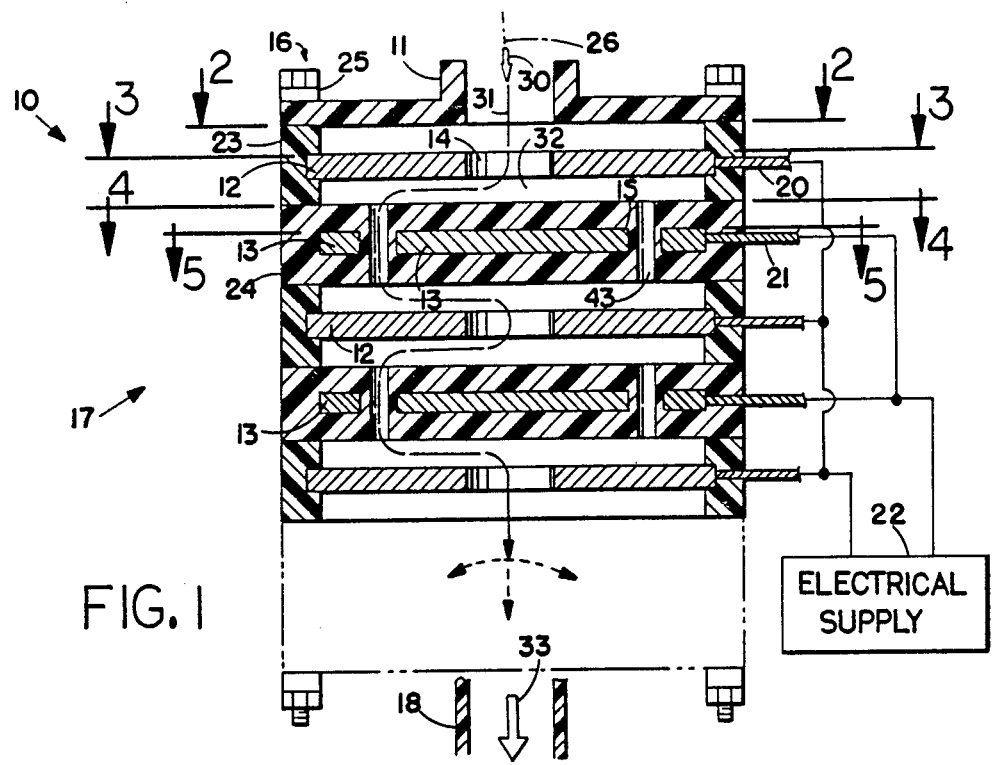
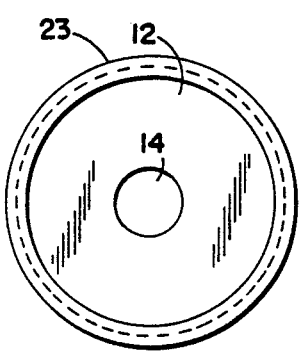
FIG.2
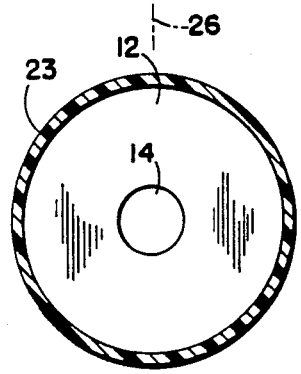
FIG.3
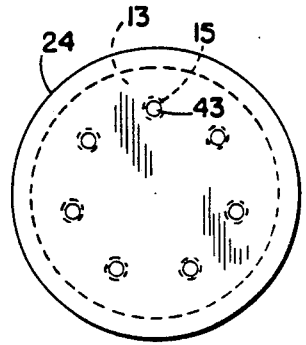
FIG.4
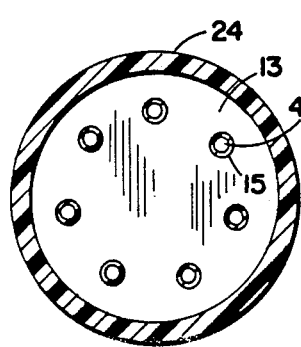
FIG.5
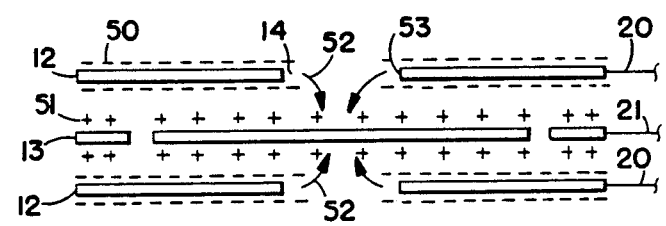
FIG.6

FLUID MIXER/CHARGER AND METHOD

This is a continuation of co-pending application Ser. No. 645,809 filed on Aug. 29, 1984, and now U.S. Pat. No. 4,684,254.

TECHNICAL FIELD

This invention relates generally, as indicated, to a mixer and charger for fluid material and to a method for mixing and charging fluid material, and, more particularly, to apparatus and method for simultaneously mixing and charging a fluid.

BACKGROUND OF THE INVENTION

In the fluid mixing art there are various devices to effect mixing of one or more fluids. Some mixers require movable mixing elements, such as blades or propellers, and motors for moving such mixing elements to effect mixing of fluid in a container or flowing therethrough. A motionless mixer is another type of mixer which does not ordinarily require a separate power or energy input to effect the desired fluid mixing because the mixer itself does not have externally powered movable mixing elements. Examples of motionless mixers are disclosed in U.S. Pat. Nos. 4,259,021 and 4,329,067, the entire disclosures of which hereby are incorporated by reference.

Mixing occurs in motionless mixers, for example of the type disclosed in such patents, in response to the flow of fluid through the mixer. In the mixers of such patents a quantity of fluid is divided into plural flow streams; the locations of respective streams is altered; the streams are permitted to mix in a generally turbulent manner; and the process preferably is repeated. To effect the desired formation and subsequent mixing of such streams, for example formed during use of such motionless mixers, two plate-like or disc-like members may be used—one separates the fluid into multiple streams and the other directs the streams for recombination thereof.

As used herein, a charged fluid means a fluid that has an excess of or a depletion of electrons, this relative to the normal or usual freely occurring uncharged state of such fluid. For example, charged air may be air that has an excess of electrons, and charged water, mist or water vapor likewise may have an excess of electrons; similarly such charged fluid may be such that it has a dearth of electrons relative to the normal, freely occurring state thereof. Examples of use of such charged fluids are presented in copending, concurrently filed, commonly assigned U.S. patent applications Ser. Nos. 645,841 for "Charged Fluid Reaction Control" and 645,810 for "Particulates Generation and Renewal", and now U.S. Pat. No. 4,684,061 the entire disclosure of which hereby are incorporated by reference.

In this disclosure the following convention is used: Reference to and illustration in the drawings of a negative or minus sign ("−"), is intended to mean a source of electrons or an excess of electrons, e.g. from the positive terminal of a battery; similarly, use of a positive or plus sign ("+"), is intended to mean a dearth of electrons and a source of relatively lower electric potential such that electrons from a source would tend to try to flow from the source to the lower electrical potential, e.g. the ground or negative terminal of a battery. Caution is urged to avoid confusion by such convention with the usual convention in electrical engineering, electronics and physics in which the positive terminal of an electrical power source, for example, is that from which current flow emanates. Rather, in the present invention, concern primarily is for the source or dearth of electrons and not for the actual electrical polarity.

Prior charging mechanisms for fluids have been relatively inefficient. Such prior systems have included point discharge devices in which electrons are discharged into a fluid, such as an air flow, but a relatively poor distribution of the charge is effected in such systems. In water systems wherein it is desired to charge water flowing past the charging device, point discharge devices tend to encounter short arcing. Moreover, in the past, various fluid charging devices have not been effective mixers, and if it was desired to effect mixing first and subsequent charging of the fluid, relatively high current supply was required. According to the present invention, though, mixing and charging occur simultaneously and, additionally, it has been found that a relatively low power supply requirement is needed. The degree of difficulty of charging a fluid increases as the distance of the fluid from the actual charging device, such as an electrode, increases. It would be desirable, and is accomplished according to the present invention, to effect simultaneous mixing and charging in a way that the distance between the fluid and the source of charge, such as the source of electrons during at least part of the time of operation of the device, is minimized; and substantially all fluid encounters at least some flow in close proximity to the electrode(s), thereby reducing power requirements and increasing efficiency of charging.

BRIEF SUMMARY OF INVENTION

In accordance with the present invention fluid is mixed and charged simultaneously during flow through a mixer/charger device.

According to one aspect of the invention, a fluid mixer/charger includes an inlet for receiving input flowing fluid, the inlet including a flow directing portion for directing fluid in the first directional flow path, an outlet positioned to receive fluid flowing from the inlet to direct the fluid along a second directional flow path different from the first one, and a charging device for applying or removing electrical charge with respect to fluid during flow by at least one of the inlet and outlet. The invention functions as an electric capacitor with a fixed bleed rate to charge fluid.

According to another aspect, a fluid mixing and charging device includes an inlet to receive an input flowing fluid, an outlet positioned to receive fluid flowing from the inlet to direct an output flowing fluid, the inlet and outlet including cooperative portions for dividing at least one stream of fluid into plural streams and for at least once changing at least one of the relative flow direction and relative location of at least part of one of the streams, and a charge coupling device to couple or to remove an electrical charge with respect to at least one of the inlet and outlet to affect the charge of fluid flowing in the device.

According to an additional aspect, a method of mixing and charging a fluid includes directing a fluid through a mixer/charger device, including receiving an input fluid, directing the input fluid along a flow path defined at least in part by at least partially electrically conductive members, at least once during flow of fluid along the flow path changing the direction of fluid flow and the number of streams in which such fluid flows, and applying or removing an electrical charge with respect to the fluid flowing through the mixer/charger.

Exemplary objects of the invention include, but are not limited to the following:

One object is effectively to apply electrical charge, either by adding or by removing electrons, of a fluid or fluid-like material.

Another object is to maximize the time that a fluid or fluid-like material remains charged.

An additional object is to minimize the electrical power requirements for effecting electrical charging of a fluid or fluid-like material.

A further object is to minimize the electrical current requirements for effecting electrical charging of a fluid or fluid-like material.

Still another object is substantially uniformly to apply and/or to maintain such electrical charge of a fluid or fluid-like material.

Still an additional object is to minimize electrical short circuiting in a fluid charging device.

Still a further object is to maximize longevity of a fluid charging device.

Even another object is to minimize boundary layer and dead spots in a fluid charging device.

Even an additional object is to increase concentration of charge available for application to a fluid to charge the same in a fluid charging device.

Even a further object is to minimize the cost for a fluid charging device.

These and other objects and advantages of the invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is an elevation view, partly in section, of a mixer/charger device according to the present invention;

FIGS. 2, 3, 4 and 5 are respective plan views, some partly in section, looking generally in the direction of the respective section lines shown in FIG. 1;

FIGS. 6 and 7 are schematic illustrations of charge distribution and flow in a mixer/charger device according to the invention;

DESCRIPTION OF THE PREFERRED EMBODIMENT

Figure 7:
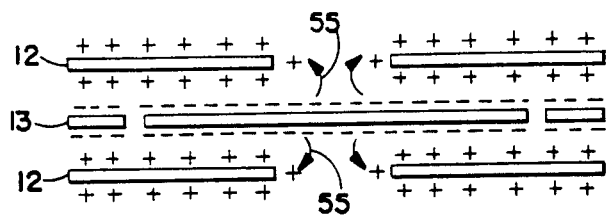

Referring in detail to the drawings, wherein like reference numerals designate like parts in the several figures, and initially to FIGS. 1–5, a mixer/charger device in accordance with the preferred embodiment and best mode of the present invention is generally indicated at 10. The mixer/charger 10 includes a fluid inlet 11 for receiving a flow of fluid from an external source, a plurality of disc-like or plate-like members 12, 13 each being generally fluid impermeable and each having one or more fluid passing openings therethrough, such as those shown at 14, 15, a holder mechanism generally indicated at 16 for holding discs 12, 13 in relative position for directing the flow of fluid through the device 10 (the discs and holder mechanism preferably forming an overall fluid flow path through container 17), and a fluid outlet 18 for directing or coupling fluid from the mixer/charger device 10 as a fluid output therefrom. Preferably the discs 12, 13 are electrically conductive, for example being formed of copper, aluminum or other electrically conductive material, and electrical leads 20, 21 couple such discs to a source of electric energy or electric power 22, for example such as a DC battery, a DC power supply, or any other electrical supply, as may be desired to apply an electric potential across a pair of discs 12, 13 to supply a source of electrons or to remove electrons with respect to fluid flowing through the mixer/charger device 10.

The holder mechanism 16 includes a retainer ring 23 preferably of electrically nonconductive material, which supports the disc 12; an insulator ring/cover 24, which holds the disc 13 and also provides electrical insulation for preferably the entire disc; and a fastener 25, such as a bolt, nut, washer, etc. assembly for example of the type illustrated. It is the purpose of the holder mechanism 16 to cooperate with the discs 12, 13 and with the fluid inlet 11 and fluid outlet 18 to form the container 17 that preferably has substantial fluid-tight integrity to prevent leakage of fluid therefrom while fluid is permitted to flow from the fluid inlet to the fluid outlet. As is described in greater detail below, it is preferable that the flow of fluid through the mixer/charger 10 be substantially unimpeded, although the direction of fluid flow may vary in the device and although the fluid flow may be divided into multiple streams and recombined into a fewer or into one single stream during flow through the mixer/charger 10. By minimizing flow impedance in the mixer/charger 10, dead spots, i.e. spots where fluid tends to stagnate in the device while fluid flows at other portions, and boundary layer formation, both of which would tend to reduce the mixing effectiveness and/or charging effectiveness of the mixer/charger 10, preferbly are minimized.

According to fluid flow operation of the mixer/charger 10, an upstream one of the discs 12, 13 provides or serves as an inlet to the next downstream disc. Moreover, one of a pair of discs 12, 13 has a different number of openings therethrough than the other of the discs 12, 13 so that as fluid flows through one disc and then through the next downstream disc, the number of streams of which overall fluid flow is composed changes. In the illustration of FIG. 1, the most upstream disc 12 has a single opening therethrough and the next downstream disc 13 has a plurality of openings therethrough. Moreover, to minimize impeding fluid flow through the mixer/charger 10, to avoid dead spots, and to avoid boundary layer formation and detriment vis-a-vis application of charge to fluid flowing through the mixer/charger, the approximate total area of the single opening and the sum of the total areas of the multiple openings in each of the discs are the same. Reference to area here is intended to mean the approximate area across an opening or the sum of the areas across each of the openings through a multiple opening disc, such area being taken approximately in a plane that is normal to the general direction of flow of fluid through such opening.

Further, it is preferred that the openings in respective relatively adjacent discs, such as the pair of discs 12, 13 that immediately follow each other in the mixer/charger 10 of FIG. 1, have respective openings that are relatively offset from each other. Accordingly, the opening 14 in the disc 12 seen in FIG. 1 is approximately at the center of the disc 12 generally along the linear flow axis 26 drawn longitudinally through the mixer/charger 10; and the openings 15 through the disc 13 are at a different radial location relative to the axis 26 offset from the same. Such offset or staggered relationship of the openings 14, 15 enables the openings themselves and the plates in which they are formed to effect a change in the directional flow of the fluid through the mixer/charger preferably also as the number of streams in which the fluid flows changes from plate to plate.

Accordingly, during the flow of fluid through the mixer/charger 10 of FIG. 1, an input supply of fluid is provided at 30 from a supply (not shown), and such fluid flows through the fluid inlet 11. The fluid follows along a flow path represented by the line 31 through the opening 14 in the disc 12. On flowing through the opening 14, the fluid flow changes direction from one generally parallel to the axis 26 to one generally normal to the axis 26. Moreover, during the course of such change in direction, a turbulent mixing of fluid occurs at the area 32. The flow stream then changes direction again to one of the openings 15 in the next downstream disc 13; the fluid passes through such opening 15 and again changes direction as it encounters the impermeable surface of the next downstream disc 12 and then flows toward the opening 14 therein encountering further mixing. Thus, fluid flow along the path 31 results in the dividing and recombining of flow streams, turbulent mixing, and directional changes of fluid flow, all of which cooperate to ensure a highly effective mixing of the fluid. Ultimately, the fluid exits the fluid outlet 18 as an exit flow 33 for subsequent use downstream of the mixer/charger 10.

Figure 8:
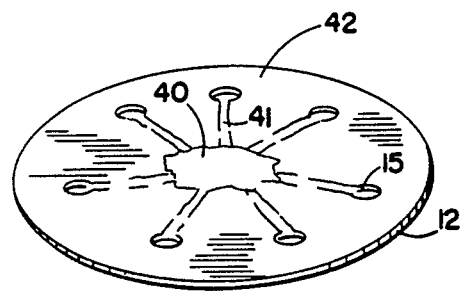
FIG. 8 is a representative illustration of a multiple opening disc employed in the mixer/charger device of the invention.

Briefly referring to FIG. 8, an illustration of a disc 13 employed in the mixer/charger 10 of FIG. 1 is shown with a depiction of the general direction of fluid flow across the disc 13. What appears to occur during the flow of fluid through the mixer/charger 10, in particular when the fluid is directed at area 32 (FIG. 1), is a turbulent impingement and mixing of the fluid. Area 40 in FIG. 8 represents the appearance of a disc 13 (such disc having been used in a motionless mixer of the present invention without the protective insulator ring/cover 24) and depicts such fluid flow condition at area 32 (FIG. 1). Moreover, on such a disc 13 (FIG. 8) there are formed (when employed in a motionless mixer of the mixer/charger 10 type device but without the insulator ring/cover 24) generally direct paths or tracks 41 from the area or zone 40 to the respective openings 15 through the disc. From the appearance of such a disc 13 (FIG. 8) after use of such disc it appears that an approximately equal amount of fluid tends to flow through each of the openings 15 to assure a generally balanced flow of fluid through the overall motionless mixer. Moreover, it is evident that a generally maximum amount of wiping or running of the fluid directly or substantially directly in engagement with the surface 42 of the disc 13 tends to occur; and such wiping is useful to effect the imparting of charge, such as the adding or removing of electrons, with respect to the fluid as it flows across or by the scrubbing of the fluid across the other surface of the disc 13 (not seen in Fig. 8) and preferably also against opposite surfaces of the discs 12 employed in the mixer/charger 10 also preferably would occur to enhance the fluid charging function of the mixer/charger, as is described in further detail below.

The arrangement of the retainer ring 23 and insulator ring/cover 24 (FIG. 1) provides the functions of holding the respective discs 12, 13 in appropriate positions in the mixer/charger 10 for effecting the desired fluid flow, mixing and charging functions and preferably also of completing the fluid-tight integrity of the mixer/charger 10 forming the container 17. Preferably the retainer ring 23 is an electrical nonconductor, such as plastic material, and preferably the insulator ring/cover 24 also is of electrically nonconductive material. Examples of the insulator ring/cover 24 may include Mylar polymer or vinyl, both materials available as a sheet of material having an adhesive material on one surface to fasten the same to a disc 13 sandwiching the disc between respective sheets of such insulator. Preferably also the holes 15 in the disc 13 are fully insulated so that the actual passage through such holes or openings 15 are effected via overall passages 43 formed through the insulator. The purpose of the insulator is described in further detail below. One or both of the retainer ring 23 and insulator ring/cover 24 may include additional relatively rigid portions that cooperate with each other and with the fastener 25 to form the container 17 of the mixer/charger 10.

To effect application of electrons to fluid flowing through the mixer/charger 10 or to remove electrons from such fluid, electrical power is provided from the supply 22 across respective pairs of discs 12, 13. Thus, for example, an electric potential may be connected via leads 20, 21 to one or more pairs of relatively adjacent discs 12, 13, as is seen in FIG. 1, for example. Application of charge to a fluid flowing through a mixer/charger 10 according to the invention was achieved using a voltage applied across a pair of relatively adjacent discs 12, 13 in the range of from greater than 0 to approximately 25,000 volts with a current flow in the milliamp range. Satisfactory charging of air flowing through the mixer/charger device 10 at a rate of approximately ½ cubic foot per minute was accomplished using such electrical energy levels. Such charging may be the application of electrons to the air, for example by providing a source of electrons or supply of electrons to the disc 12 while the insulated disc 13 is maintained at a relatively lower electric potential. Alternatively, the polarity could be reversed whereby a supply of electrons would be provided the insulated disc 13 while the disc 12 was at a relatively lower electric potential; in this case electrons essentially are removed from the fluid. Thus, according to the invention, reference to charging of fluid may refer equivalently to the application of electrons or the removal of electrons with respect to the fluid.

The mixer/charger 10 functions in a sense as a capacitor whereby the relatively adjacent discs 12, 13, for example, form the opposite plates of the capacitor, and the dielectric constant of the capacitor may be a function of the dielectric constant of the insulator ring/cover 24 and the dielectric constant of the fluid between adjacent discs. Thus, if the fluid were air, the mixer/charger 10 would function like an air capacitor. Such capacitor according to the invention, then, is provided with a controlled bleed of electric charge, and such bleed may be a function of the aforementioned dielectric constant values, of the usual parameters, such as capacitor plate size, temperature, voltage and/or current values, etc., and such controlled bleed may also be a function of the flow rate of fluid through the mixer/charger 10. The flow rate and/or mixing may alter the effective distribution of charge in the fluid, the wiping or scrubbing action of the fluid against respective discs and/or the insulator ring/cover 24 surface(s), etc. As the fluid mixes during flow, charge tends to be distributed through the fluid thereby helping to maximize the overall charging as the fluid flows across and through respective discs. As the area of the openings 14 and the sum of the areas of the openings 15 in respective discs is approximately the same, dead spots and boundary layers will be minimized and preferably avoided in total so as to maximize the continuing flow of fluid through the mixer/charger, distribution of charge in the fluid, wiping action of the fluid against respective discs, etc.

It is noted here that although reference to wiping of a disc, such as disc 13, may be stated herein, in the event such disc is protected by an insulator ring/cover 24, for example as is shown in FIG. 1, such referral indicates wiping action against the exposed surface area of the insulator ring/cover 24. In any event, as the fluid wipes across or scrubs over respective discs, charge is transferred or removed with respect to the fluid, i.e. electrons are added or removed with respect to the fluid. Additionally, since there is a relatively large surface area available in the mixer/charger 10 for such charge transfer, a greater concentration of charge and transfer thereof to fluid flowing through the mixer/charger can be accomplished than was heretofore possible in prior art devices.

After a fluid has been charged in the mixer/charger 10, it may be desirable to maintain such charge for a maximum period of time. For such purposes, it is desirable that the fluid outlet 18 be of an electrically nonconductive material that tends not to dissipate, to bleed, to ground, or otherwise to effect the charge of the fluid 33 as the same passes through the fluid outlet 18. It also may be desired to form the fluid inlet 11 of material simialr to that of which the fluid outlet 18 is made in order to avoid pre-charging or pre-affecting the charge of the fluid input 30; alternatively, in order to help neutralize any pre-existing charge on the input fluid 30, it may be desired to select the fluid inlet 11 to be of a material that is electrically conductive and does in fact tend to neutralize pre-existing charge. Furthermore, if desired, the container 17 may include an additional housing (not shown) surrounding those portions of the mixer/charger 10 illustrated in FIG. 1 for further fluid-tight integrity thereof, electrical isolation thereof, thermal insulation thereof, etc.

Turning now to FIG. 6, three representative discs 12, 13 are illustrated coupled by respective leads 20, 21 to an electrical supply. The discs 12 are shown having a source or excess supply of electrons (represented by minus signs) and the disc 13 is shown having a dearth of electrons, i.e. being at a relatively lower relative electric potential (with representation thereof being shown by the plus signs 51 on both sides thereof). Arrows 52 represent the tendency of electrons to flow from the source thereof toward the source of relatively lower electric potential. Due to such tendency of electron flow represented by arrows 52, the edge 53 circumscribing the center opening 14 in each disc 12 tends to become an area of rather high electrical stress, this in particular when the discs 12 have the source of electrons. (Such discs 12 may be considered electrically, i.e. in conventional electrical engineering terms, as the positive plate and the disc 13 may be considered the ground plate or relatively negative plate in such circumstances, according to ordinary convention.)

The retainer ring 23 and insulator ring/cover 24 space relatively adjaent discs 12, 13 in such way as to provide adequate space for flow of fluid therebetween and also provide for electrical insulation between relatively adjacent discs. In order to avoid break down of the insulation due to the aforementioned high stress concentration about the edge 53 of the opening 14 in the disc 12, it is, accordingly, preferable to provide full insulation about the disc 13 rather than about the disc 12. If the insulation would not break down or if the voltage and stress concentration, in particular, at the area 53 would not effect break down of the insulation, then it would be possible to employ insulation, such as the insulator ring/cover 24, with respect to the disc 12 instead of with the disc 13. According to the preferred embodiment and best mode of the invention, it is desirable to insulate that disc 12 or 13 which is deficient in electrons to minimize insulation break down. In this case, especially when there is a high electrical stress at the large opening 14 due to electron concentration there, such stress, the flow of electrons from such area 53 toward the other disc, and the direct wiping, contact, engagement, and flow-by of fluid with respect to the high stress concentration area 53 and the overall surface of disc 12 maximizes charging efficiency of the fluid.

Another important advantage of insulating the disc 13, especially when the disc 12 has a supply of electrons thereon during use of the mixer/charger 10, e.g. to charge air or other fluid flowing through the mixer/charger, is to prevent the disc 13 from discharging the flowing fluid. Accordingly, the electrons on disc 12 will tend to charge the fluid, and the insulation effected by the insulator ring/cover 24 on the disc 13 tends to minimize the possibility of any removal of electons from the fluid flowing therepast and therethrough. To maximize charging of a fluid flowing through a mixer/charger 10, especially if the fluid were air, it is desirable that the disc 12 provides the source of electrons and that the disc 13 be electrically insulated in the manner illustrated in FIG. 1.

However, it is noted that if it were desired for other reasons to do so, the disc 12 could be insulated and the disc 13 could be exposed substantially fully to the fluid flowing thereacross and therethrough, even though the disc 12 would be provided with a source of electrons, i.e. at a relatively higher electric potential than the disc 13. In this case, then, since the disc 12 is the insulated one relative to the fluid flowing thereby and therethrough, and since the disc 13 is at a relatively lower potential, a positive charging, i.e. a removal of electrons, of the fluid flowing through the mixer/charger 10 would occur. This effect also can be accomplished simply by reversing the polarity of the electrical connections to the discs 12, 13 from the electrical supply 22. Note that for minimum concentration of electrical stress in the mixer/charger, it would be desired that the disc having the source of electrons not be the disc having the larger hole 14.

Another way to reduce the effective electrical stress in the mixer/charger 10 would be to reverse the polarity of the discs 12, 13, whereby the disc 13 provides the source of electrons and the disc 12 provides a lower electric potential. In such case, the stress concentration proximate the relatively small openings 15 in the disc 13 is relatively lower than the stress occurring in the aforementioned example in which the supply of electrons is found at the area 53 (FIG. 6). Indeed, as is illustrated in FIG. 7, since there is a relatively large surface area from which electrons tend to leave disc 13 to travel toward discs 12 in the direction of the arrows 55, there is a relatively low concentration of stress at the disc 13 compared to that encountered in the embodiment illustrated in FIG. 6. Break down of insulation at the small openings 15 did not appear to occur which indicates a lower stress than in the embodiment in which the disc 12 had the excess or supply of electrons.

Figure 9:
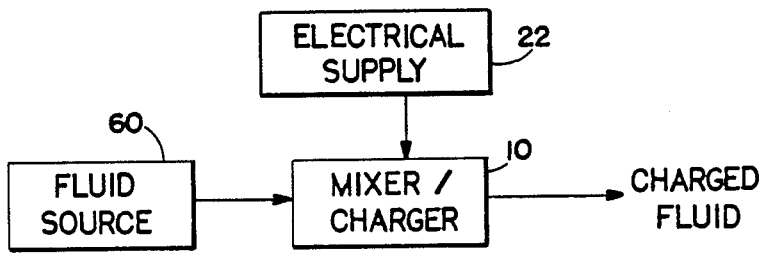
FIG. 9 is a schematic block diagram depicting use of a mixer/charger device according to the invention.

The mixer/charger according to the invention may be employed to charge a variety of fluids, including, for example, air, water, or other fluids. A fluid source 60 shown in FIG. 9 would be employed to provide fluid to the mixer/charger 10. An electrical supply 22 would be coupled to the mixer/charger 10 to provide an appropriate electrical input. As a result, a charged fluid 61 would be emitted from the mixer/charger. Such charged fluid may be employed, for example, for use in chemical reactions, for use in providing appropriate ionized fluid, such as ionized air which tends to provide a certain feeling of wellbeing when emitted into an area inhabited by persons, to seed clouds, and so on.

Figure 10:
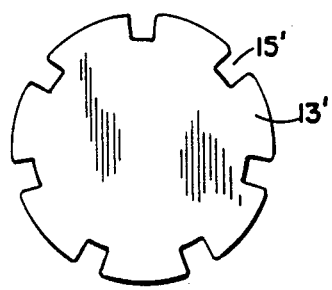
FIG. 10 is a plan view of an alternate embodiment of disc useful in the mixer/charger device of the invention to form multiple flow streams.

Briefly referring to FIG. 10, a modified illustration of a disc 13' according to the invention is illustated. The disc 13' is generally fluid impermeable and has a plurality of notches or cut-outs 15' at various locations along the perimeter. The notches or cut-outs 15' and the perimeter of the disc may be employed in connection with a modified insulator ring/cover (not shown) or other casing for mixer/charger to define flow passages through such notches from one side of the disc 13' to the other side thereof. Accordingly, the disc 13' with such notches cooperating with the casing, etc., would be functional equivalently to the openings 15 in the disc 13 described in greater detail above.

Moreover, as a further alternate embodiment to the invention, the fluted or other configuration of discs disclosed in the above-mentioned U.S. Pat. No. 4,259,021 may be employed. In such arrangement additional or possibly different surface area contact, fluid mixing capabilities, etc., may be achieved over and above that achieved using the flat discs of the preferred embodiment and best mode of the present invention disclosed in detail herein.

Applicant has discovered that a mixer/charger according to the present invention may have an optimum length and an optimum number of discs 12, 13 forming respective capacitors therein. Too long a mixer/charger and, accordingly, flow path with too many such plates may result in inefficiency and in some instances may result in a loss of charge of the fluid after a maximum charge already had been developed. Thus, it may be necessary to use a pragmatic approach to determine an optimum length for an optimum fluid to effect the desired charging without discharging the fluid.

In using the mixer/charger of the invention, then, it will be appreciated that a fluid is provided to the mixer/charger. The mixer/charger thoroughly mixes the fluid by changing the number of streams in which the fluid is flowing from one or a relatively few streams to a relatively larger number of streams while also changing the flow direction of the various streams and enabling a relatively turbulent mixing of the fluid between and at respective discs. Simultaneously electric charge is applied or removed with respect to the fluid flowing through the mixer/charger.

The discs may be plate-like, fluted, truncated conical, etc. and preferably are of electrically conductive material, such as copper, aluminum, steel, or the like, preferably being impermeable to fluid flow other than at the distinct openings therethrough. The retaining ring 23 and insulator ring/cover 24 preferably are of electrically nonconductive material as also preferably is the fluid 11 and fluid outlet 18.

STATEMENT OF INDUSTRIAL APPLICATION

The invention may be employed to effect mixing and charging of a fluid flowing therethrough, especially preferably without using external power for the mixing function and also while minimizing the amount of power required to effect charging of the fluid.

I claim:

1. A fluid mixing and charging device, comprising inlet means for receiving an input flowing fluid, outlet means positioned to receive fluid from said inlet means for directing an output flowing fluid, each of said inlet means and outlet means comprising a plurality of disc-like members, said disc-like members being positioned in the device along an overall flow path thereof to form a plurality of capacitors, one of said disc-like membes including opening means therethrough for dividing fluid directed thereto into a plurality of streams, and the other of said disc-like members having a single opening therethrough for recombining such streams for mixing thereof, and charge coupling means coupled to said inlet and outlet means for coupling or removing an electrical charge wiht respect to at least one of said inlet means and outlet means to affect the charge of fluid flowing in the device.

2. The device of claim 1 comprising electric insulating means for insulating substantially all surfaces of one of said disc-like members.

3. The device of claim 1, said disc-like members comprising respective generally parallel plates of electrically conductive material forming said capacitors, said charge coupling means providing a source of electrons to one of said disc-like members, and insulating material for electrically insulating the disc-like member that does not receive such electrons from said charge coupling means, and one of said disc-like members having a single relatively large opening for passing fluid therethrough while charging the same and another of said disc-like members having a plurality of relatively smaller openings therethrough for passing fluid therethrough while dividing the same into multiple streams, and wherein the sum of the areas of the openings in said latter disc-like member is at least approximately equal to the area of the single opening in the former disc-like member.

4. The device of claim 3, said one disc-like member receiving such electrons having a single relatively large opening and said other disc-like member having plural openings non-aligned with said large opening.

5. The device of claim 1, said disc-like members comprising respective generally parallel plates of electrically conductive material forming a capacitor, said charge coupling means providing a souce of electrons to one of said disc-like members, and insulating material for electrically insulating the disc-like member that does receive such electrons from said charge coupling means, and one of said disc-like members having a single relatively large opening for passing fluid therethrough while charging the same and another of said disc-like members having a plurality of relatively smaller openings therethrough for passing fluid therethrough while dividing the same into multiple streams, and wherein the sum of the areas of the openings in said latter disc-like member is at least approximately equal to the area of the single opening in the former disc-like member.

6. A method of mixing and charging a fluid, comprising
   directing a fluid through a mixer/charger device, including receiving an input fluid,
   directing such received fluid along a flow path defined at least in part by one or more openings in at least partially electrically conductive members,
   at least once during flow of fluid along such flow path, changing the direction of fluid flow and dividing said fluid into a plurality of streams by passing it through a plurality of openings in one of said streams and recombining said streams by passing them through a single opening in another of said members, and
   applying or removing an electrical charge with respect to fluid flowing through such mixer/charger.

7. The fluid mixing and charging device of claim 1 wherein said single opening has a first area, said opening means comprises plural openings and the individual areas of said plural openings sum to a second area, wherein the relative sizes of said first and second areas minimize impedance to flow of fluid through said mixer/charger.

8. The fluid mixing and charging device of claim 7 wherein said first and second areas are approximately equal to each other.

9. The fluid mixing and charging device of claim 1 further including a container containing said disc-like members and having a wall member adjacent the peripheries of said disc-like members, wherein said opening means comprises a plurality of peripheral cut-outs in one of said disc-like members cooperatively forming with said wall member a plurality of openings.

10. The method of claim 6 including selecting the area of said single opening relative to the total area of said plurality of openings to minimize the impedance to the flow of fluid.

11. The method of claim 10 including selecting the area of said single opening to be approximately equal to the total area of said plurality of openings.

12. The device of claim 1, wherein at least one of said opening means is notch-like and is cooperative with further means to define a respective flow passage of a disc-like member.

13. The device of claim 12, further comprising casing means for containing at least one of said disc-like members, and said further means comprising at least a portion of said casing means.

14. A fluid mixing and charging device, comprising
   inlet means for receiving an input flowing fluid,
   outlet means positioned to receive fluid from said inlet means for directing an output flowing fluid,
   each of said inlet means and outlet means comprising a plurality of disc-like members, said disc-like members being positioned in the device along an overall flow path thereof to form a plurality of capacitors, one of said disc-like members including opening means therethrough for dividing fluid directed thereto into a plurality of streams, and the other of said disc-like members having opening means therethrough for recombining such streams for mixing thereof, wherein the area of said opening means in respective disc-like members is about equal.

15. The device of claim 14, comprising further means for cooperating with at least one of said opening means to bound a flow passage through a respective disc-like member.

16. The device of claim 15, comprising casing means for containing a plurality of said disc-like members.

17. The device of claim 16, said further means comprising a wall of said casing means.

* * * * *